(12) United States Patent
Iwanaga

(10) Patent No.: US 11,636,585 B2
(45) Date of Patent: *Apr. 25, 2023

(54) SUBSTRATE DEFECT INSPECTION APPARATUS, SUBSTRATE DEFECT INSPECTION METHOD, AND STORAGE MEDIUM

(71) Applicant: TOKYO ELECTRON LIMITED, Tokyo (JP)

(72) Inventor: Shuji Iwanaga, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,888

(22) Filed: Dec. 9, 2021

(65) Prior Publication Data

US 2022/0101517 A1 Mar. 31, 2022

Related U.S. Application Data

(63) Continuation of application No. 17/014,556, filed on Sep. 8, 2020, now Pat. No. 11,227,381, which is a (Continued)

(30) Foreign Application Priority Data

Jan. 17, 2018 (JP) .............................. JP2018-005584

(51) Int. Cl.
*G06T 7/00* (2017.01)
*G06T 7/66* (2017.01)

(52) U.S. Cl.
CPC .......... *G06T 7/0006* (2013.01); *G06T 7/0004* (2013.01); *G06T 7/66* (2017.01);
(Continued)

(58) Field of Classification Search
CPC .................... G06T 2207/20081; G06V 10/764
(Continued)

(56) References Cited

U.S. PATENT DOCUMENTS 10,395,362 B2 8/2019 Gupta et al.
2016/0163035 A1 6/2016 Chang et al.
(Continued)

FOREIGN PATENT DOCUMENTS

JP 2004-294360 A 10/2004
JP 2008-281580 A 11/2008
(Continued)

*Primary Examiner* — Kiet M Doan
(74) *Attorney, Agent, or Firm* — Nath, Goldberg & Meyer; Jerald L. Meyer; Tanya E. Harkins

(57) ABSTRACT

An apparatus for classifying a defect generated in a substrate, includes: a first storage part for storing a first image data for defect classification determination, which includes a defect region in which the defect is generated and a surrounding region of the defect region; a first estimation part for estimating a first type of defect by using a deep learning system, based on the first image data; a second storage part for storing a second image data for defect classification estimation, which is obtained by expressing the defect region and the surrounding region by a binarized data; a second estimation part for estimating a second type of defect by using a rule-based system, based on an attribute of the defect region extracted from the second image data; and a comprehensive determination part for comprehensively determining a type of defect based on the first and second types of defects.

11 Claims, 12 Drawing Sheets

Related U.S. Application Data continuation of application No. 16/248,329, filed on Jan. 15, 2019, now Pat. No. 10,818,004.

(52) U.S. Cl.
CPC ............... *G06T 2207/10024* (2013.01); *G06T 2207/20076* (2013.01); *G06T 2207/20084* (2013.01); *G06T 2207/20132* (2013.01); *G06T 2207/30148* (2013.01)

(58) Field of Classification Search
USPC ........................................................ 382/149
See application file for complete search history.

(56) References Cited

U.S. PATENT DOCUMENTS

| | | | |
|---|---|---|---|
| 2017/0357844 A1* | 12/2017 | Comaniciu | ............ G16H 30/00 |
| 2018/0373015 A1 | 12/2018 | Sakamoto et al. | |
| 2019/0137884 A1* | 5/2019 | Jung | ..................... G03F 7/7065 |
| 2019/0220992 A1 | 7/2019 | Li et al. | |
| 2021/0125325 A1 | 4/2021 | Huang et al. | |

FOREIGN PATENT DOCUMENTS

| | | |
|---|---|---|
| JP | 2009-238992 A | 10/2009 |
| JP | 2011-174757 A | 9/2011 |
| JP | 2012-26982 A | 2/2012 |

* cited by examiner

| Region | Defect classification |
|--------|----------------------|
| P1 | Scratch |
| P2 | Hot spot |
| P3 | Comet |
| P4 | Arcing |
| P5 | Comet |
| P6 | Arcing |

FIG. 12

| | | Rule-base classification determination result | | | | | |
|---|---|---|---|---|---|---|---|
| | Defect class | Center mode | Hot spot | Defect C | Defect D | ... | Classification impossible |
| DL classification determination result | Center mode | Center mode | Hot spot | Defect C | Defect D | ... | Classification impossible |
| | Hot spot | Center mode | Hot spot | Hot spot | Defect D | ... | Hot spot |
| | Defect C | Defect C | Hot spot | Defect C | Defect D | ... | Classification impossible |
| | Defect D | Center mode | Defect D | Defect C | Defect D | ... | Defect D |
| | ... | ... | ... | ... | ... | ... | ... |
| | Classification impossible | Center mode | Hot spot | Defect C | Defect D | ... | Classification impossible |

SUBSTRATE DEFECT INSPECTION APPARATUS, SUBSTRATE DEFECT INSPECTION METHOD, AND STORAGE MEDIUM

CROSS-REFERENCE TO RELATED APPLICATION

This is a Continuation Application of U.S. patent application Ser. No. 17/014,556, filed Sep. 8, 2020, which is a continuation of application Ser. No. 16/248,329, filed on Jan. 15, 2019, an application claiming the benefit from Japanese Application No. 2018-005584, filed Jan. 17, 2018, the contents of each of which are hereby incorporated by reference in their entirety.

TECHNICAL FIELD

The present disclosure relates to a technique for determining whether and what kind of defect is generated in a substrate based on an image data obtained by picking up an image of the substrate.

BACKGROUND

In a photolithography of a semiconductor device manufacturing process, formation of a resist film by application of a resist, exposure of the resist film, and development of the resist film are sequentially performed on a front surface of a semiconductor wafer (hereinafter referred to as a wafer) W which is a substrate. Thus, a resist pattern is formed.

With respect to the wafer W that has been subjected to a series of processes, an inspection apparatus inspects whether a good resist pattern is formed on the front surface of the wafer W, whether scratches are formed on the front surface of the wafer W, whether foreign matter adheres onto the front surface of the wafer W, or the like. Such a problem is referred to as a defect. There are various types of defects depending on the causes of respective defects. Therefore, from the viewpoint of managing the manufacture of a semiconductor device, the inspection apparatus is required to have a function of not only determining whether a defect is generated in the substrate but also determining the type of found defect.

The inspection apparatus is configured to pick up an image of the wafer using, for example, a CCD camera or the like while relatively moving an illumination area with respect to a mounting table on which the wafer is mounted, and to process the picked-up wafer to determine the presence or absence of defect and the type of defect.

As a method for determining the type of defect, a system called deep learning is utilized. For example, in the related art, there is known a technique in which feature amounts (a feature such as shade, color or the like of defect, a geometric feature of defect, etc.) of defects are calculated based on an image of an inspection object, which is obtained by picking up an image of a substrate, and the defects are classified using a method such as a neural network or the like based on the feature amounts.

Defect classification by the deep learning system is performed by a supervised learning. However, in a case where such a learning is insufficient, misclassification may occur. Meanwhile, from the viewpoint of further improving the yield of a semiconductor integrated circuit, there is a desire to perform defect classification in a more reliable manner.

SUMMARY

Some embodiments of the present disclosure provide a technique capable of appropriately classifying defects generated in a substrate based on an image of an inspection object, which is obtained by picking up an image of the substrate.

According to one embodiment of the present disclosure, there is provided a substrate defect inspection apparatus for classifying a defect generated in a substrate based on a picked-up image as an inspection object which is obtained by picking up an image of the substrate, including: a first storage part configured to store a first image data for defect classification determination, wherein the first image data is cut out from an image created based on the picked-up image and includes a defect region in which the defect is generated and a surrounding region of the defect region, and a pixel value is assigned to each of a plurality of pixels of the first image data; a first estimation part configured to estimate a first type of defect by using a deep learning system, based on the first image data stored in the first storage part; a second storage part configured to store a second image data for defect classification estimation, wherein the second image data is created based on the picked-up image and is obtained by expressing the defect region in which the defect is generated and the surrounding region of the defect region by a binarized data; a second estimation part configured to estimate a second type of defect by using a rule-based system, based on an attribute of the defect region extracted from the second image data stored in the second storage part; and a comprehensive determination part configured to comprehensively determine a type of defect based on the first type of defect estimated by the first estimation part and the second type of defect estimated by the second estimation part.

According to another embodiment of the present disclosure, there is provided a substrate defect inspection method for classifying a defect generated in a substrate, based on a picked-up image as an inspection object which is obtained by picking up an image of the substrate, the method including: a first estimating process of estimating a first type of defect by using a deep learning system, based on a first image data for defect classification determination, wherein the first image data is cut out from an image created based on the picked-up image and includes a defect region in which the defect is generated and a surrounding region of the defect region, a pixel value is assigned to each of a plurality of pixels of the first image data; a second estimating process of estimating a second type of defect by using a rule-based system, based on a second image data for defect classification estimation which is created based on the picked-up image and is obtained by expressing the defect region in which the defect is generated and the surrounding region of the defect region by a binarized data, and an attribute of the defect region extracted from the second image data; and a comprehensive determining process of comprehensively determining a type of defect based on the first type of defect estimated by the first estimating process and the second type of defect estimated by the second estimating process.

According to yet another embodiment of the present disclosure, there is provided a non-transitory computer-readable storage medium that stores a software used in an apparatus for classifying a defect generated in a substrate based on a picked-up image as an inspection object which is obtained by picking up an image of the substrate, wherein the software includes a program having a group of instructions for executing the aforementioned substrate defect inspection method.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 12 is a priority matrix table for implementing a priority determination method.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

The substrate defect inspection apparatus according to the present disclosure is applied to a coating/developing apparatus that performs, for example, a resist application and a development after exposure, and captures an image of a wafer picked up by an imaging module provided in the coating/developing apparatus to perform a defect inspection.

Figure 1:
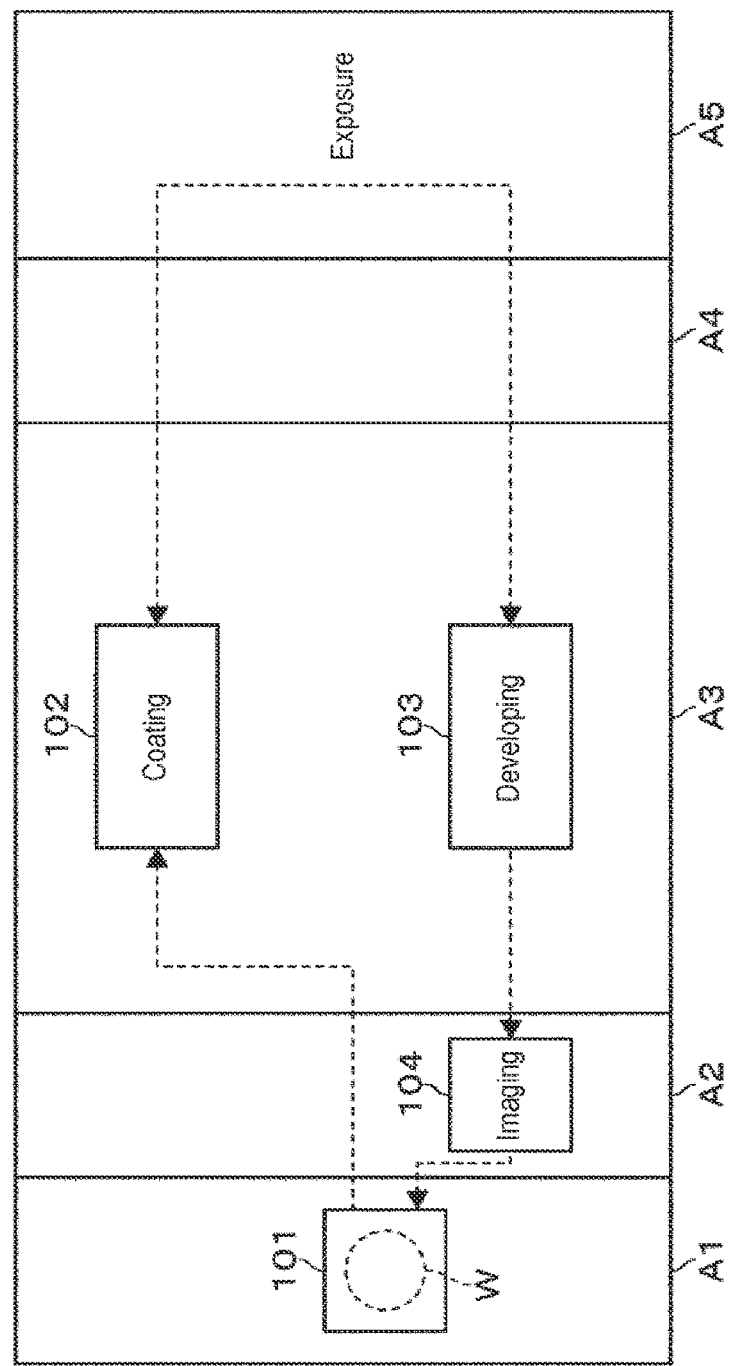
FIG. 1 is an overall configuration diagram schematically showing a coating/developing apparatus to which the present disclosure is applied.

First, an example of the coating/developing apparatus will be described with reference to FIG. 1 which is a schematic diagram. The coating/developing apparatus is constituted by linearly connecting a carrier block A1, an intermediate block A2, a processing block A3, and an interface block A4 in this order in the horizontal direction. An exposure device A5 is connected to the interface block A4. A carrier 101 in which a wafer W as a substrate is received is transferred to and mounted on the carrier block A1 by a carrier transfer mechanism (not shown). The processing block A3 is provided with a coating module 102 for supplying a resist to a front surface of the wafer W as a substrate to form a resist film, and a developing module 103 for supplying a developing solution onto the resist film exposed along a predetermined pattern by the exposure device A5 to form a resist pattern. The intermediate block A2 includes an imaging module 104 for imaging the entire front surface of the wafer W thus developed. The entire front surface of the wafer W may be the entire front surface of a region where a semiconductor device is formed.

Each of the blocks A1 to A4 includes a wafer transfer mechanism (not shown). The wafer W received in the carrier 101 is taken out by the wafer transfer mechanism, and transferred in the order of the intermediate block A2→the coating module 102→the interface block A4→the exposure device A5→the interface block A4→the developing module 103→the imaging module 104. In this way, the wafer W is returned to the carrier 101. A dotted arrow in FIG. 1 indicates a transfer path of the wafer W. By transferring the wafer W in this manner, the resist pattern is formed on the front surface of the wafer W, and subsequently, an image of the entire front surface of the wafer W is picked up by the imaging module 104.

Figure 2:
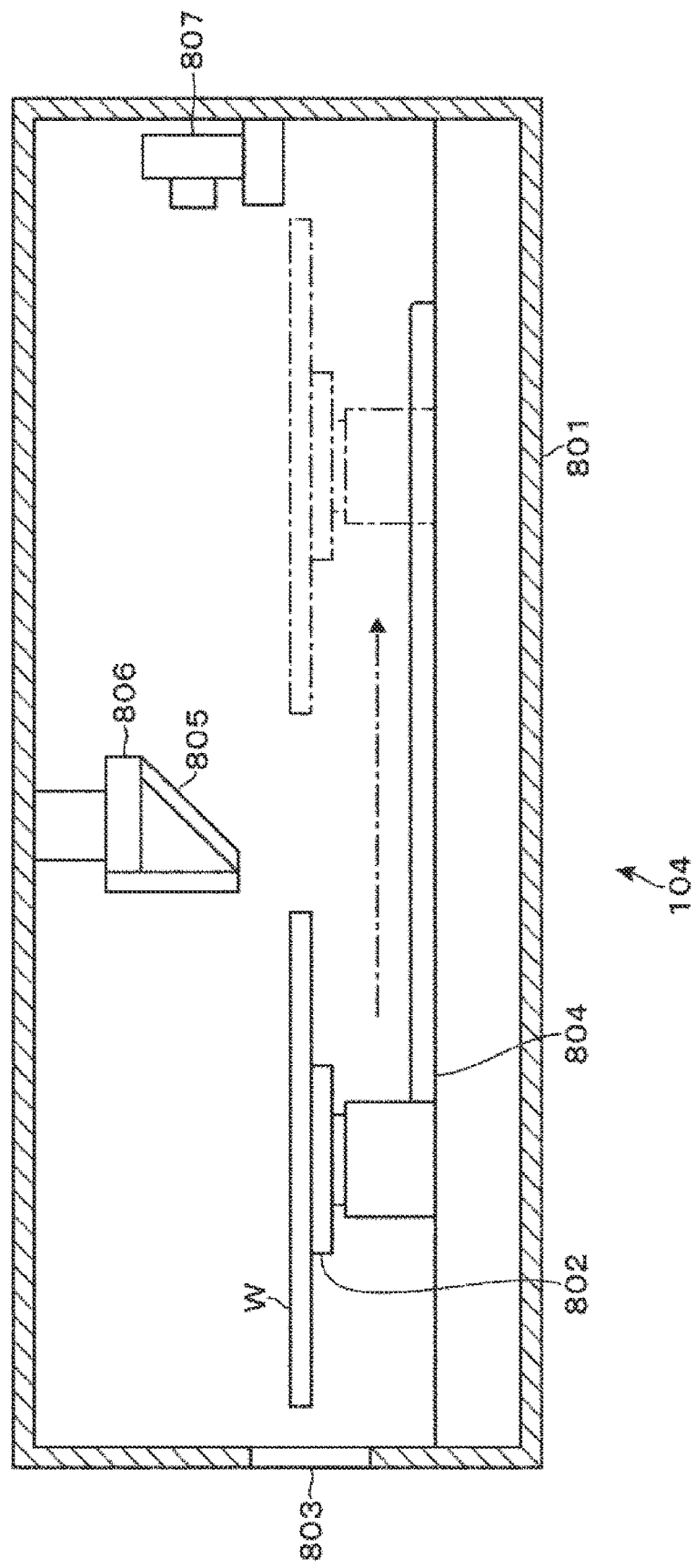
FIG. 2 is a schematic view of an imaging module provided in the coating/developing apparatus to acquire an image of a front surface of a wafer.

As shown in FIG. 2, the imaging module 104 includes a housing 801. A mounting table 802 that holds the wafer W in a horizontal posture by adsorbing the central portion of a back surface of the wafer W, is installed inside the housing 801. In FIG. 2, reference numeral 803 denotes a transfer port of the wafer W, which is opened in a side wall of the housing 801. Assuming that a side where the transfer port 803 is opened in the housing 801 is a front side, the mounting table 802 is configured to be horizontally movable between the front side and a back side. In FIG. 2, reference numeral 804 denotes a guide for horizontally moving the mounting table 802 and extends from the front side to the back side.

A horizontally-elongated half mirror 805 configured to extend in a left-right direction inside the housing 801 is provided above the guide 804. The half mirror 805 is provided obliquely with respect to the extension direction of the guide 804 as viewed from a side. Further, a lighting part 806 for irradiating light downward through the half mirror 805 is provided above the half mirror 805. An imaging part 807 composed of, for example, a CCD camera, is provided to face the half mirror 805 at the back side. Light irradiated from the lighting part 806 passes through the half mirror 805 and is incident onto an irradiation region below the half mirror 805. Next, a reflected light reflected off an object in the irradiation region is reflected at the half mirror 805 and introduced into the imaging part 807. That is to say, the imaging part 807 can pick up an image of the object located below the half mirror 805. Subsequently, while the wafer W is moving along the guide 804 from the front side to the back side below the half mirror 805, the imaging part 807 performs the pickup intermittently to pick up an image of the entire front surface of the wafer W, thereby creating an image data of the entire front surface of the wafer W.

In the following description, for the sake of avoiding confusion of terms, the image data of the image of the entire front surface of the wafer W picked up by the imaging part 807 is referred to as a picked-up image.

Next, embodiments of the substrate defect inspection apparatus and a substrate defect inspection method of the present disclosure will be described. According to an outline of the embodiment of the present disclosure, two types (first and second) of image data for defect classification determination, which includes a defect region, are acquired based on a picked-up image. Specifically, a first type of defect is estimated by a first estimation method based on the first image data, and a second type of defect is estimated by a second estimation method based on the second image data. The type of defect is comprehensively determined based on respective estimation results.

Figure 3:
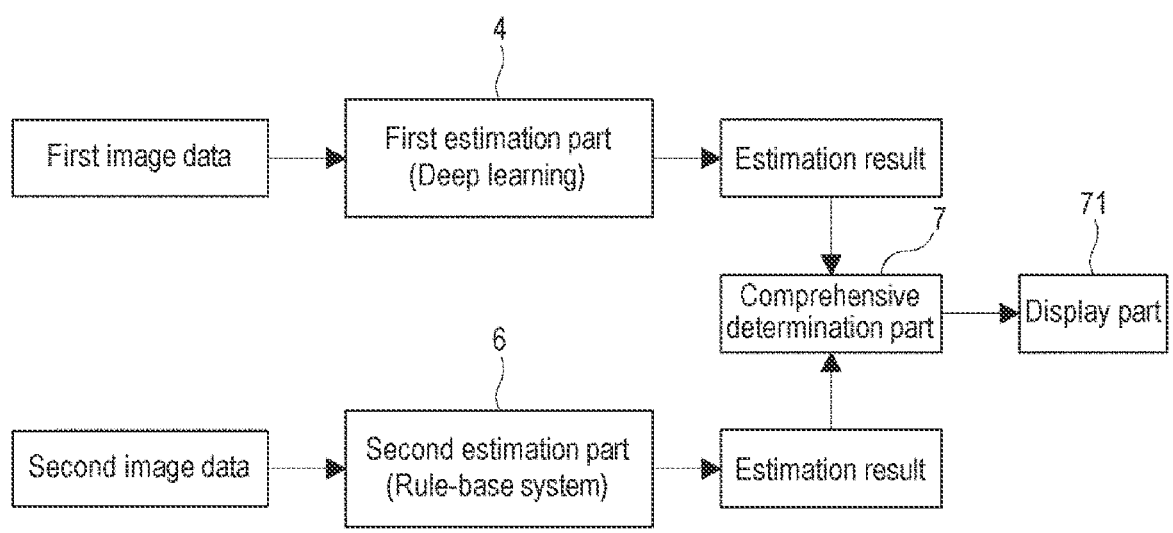
FIG. 3 is an explanatory diagram schematically showing an embodiment of a substrate defect inspection apparatus according to the present disclosure.

FIG. 3 is an explanatory diagram showing the outline of the embodiment of the present disclosure. The first image data is inputted to a first estimation part 4. The first estimation part 4 estimates the first type of defect included in the first image data. The first estimation part is constituted of a deep learning-based system (software) which will be described in detail later. The first image data includes a defect region in which defect is generated and a surrounding region of the defect region, and is a rectangular image data cut out from an image obtained by processing the picked-up image. The first image data may be a monochrome image data or a color image data. In the following embodiments, a case in which the first image data is the color image data, namely an image data in which each pixel value of an R component, a G component, and a B component is assigned to each pixel, will be described as an example.

More specifically, in the case where a plurality of defect regions corresponding to a plurality of defects is included in the picked-up image, the first image data is the rectangular image data including only one defect region among the plurality of defect regions and the surrounding region of the respective defect region. Although there may be a case where a plurality of defects is generated at the same portion in practice, the expression "including only one defect region" may mean a region recognized as one defect region in the software.

In addition, the second image data is an image data obtained by binarizing a defect region where defect is generated and a surrounding region of the respective defect region. A second estimation part 6 estimates the second type of defect using a rule-based system, based on an attribute of the defect region extracted from the second image data, ultimately a position of the defect region on the wafer W.

It is necessary that the defect region constituted by the first image data and the defect region constituted by the second image data is the same region in the picked-up image.

Reference numeral 7 denotes a comprehensive determination part which comprehensively determines the type of defect based on the first type of defect estimated by the first estimation part 4 and the second type of defect estimated by the second estimation part 6. Reference numeral 71 denotes a display part for displaying the type of defect comprehensively determined by the comprehensive determination part 7.

Figure 4:
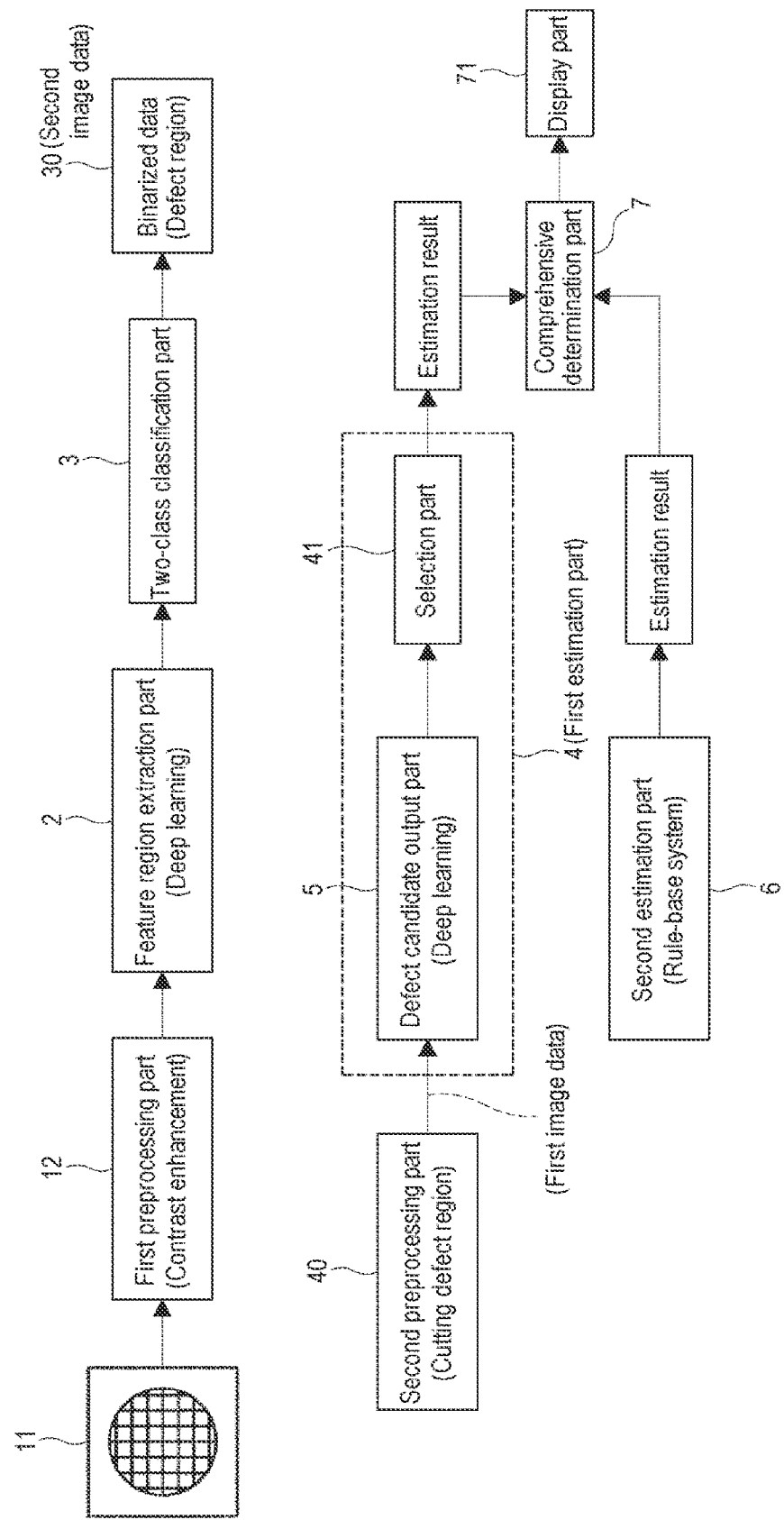
FIG. 4 is an explanatory diagram showing a combination of a configuration and a data flow in an embodiment of a substrate defect inspection apparatus according to the present disclosure.

FIG. 4 is an explanatory diagram showing a combination of the overall configuration and data flow in the embodiment of the present disclosure. Creation of the first image data and the second image data and the processing of the image data will be described with reference to FIG. 4. Reference numeral 11 denotes the picked-up image including the image of the entire front surface of the wafer W picked up by the imaging part 807 (see FIG. 2). In the picked-up image 11, each pixel value (received light intensity) of an R (red) component, a G (green) component, and a B (blue) component is assigned to each pixel. A contrast enhancement process is performed on the picked-up image 11 by a first preprocessing part 12.

The contrast enhancement process is a process of enhancing a component selected from the R component, the G component, and the B component to easily extract the defect region from the picked-up image 11. For example, the contrast enhancement process is, for example, a process of increasing a pixel value of a predetermined range size of the selected component by a predetermined value.

Figure 5:
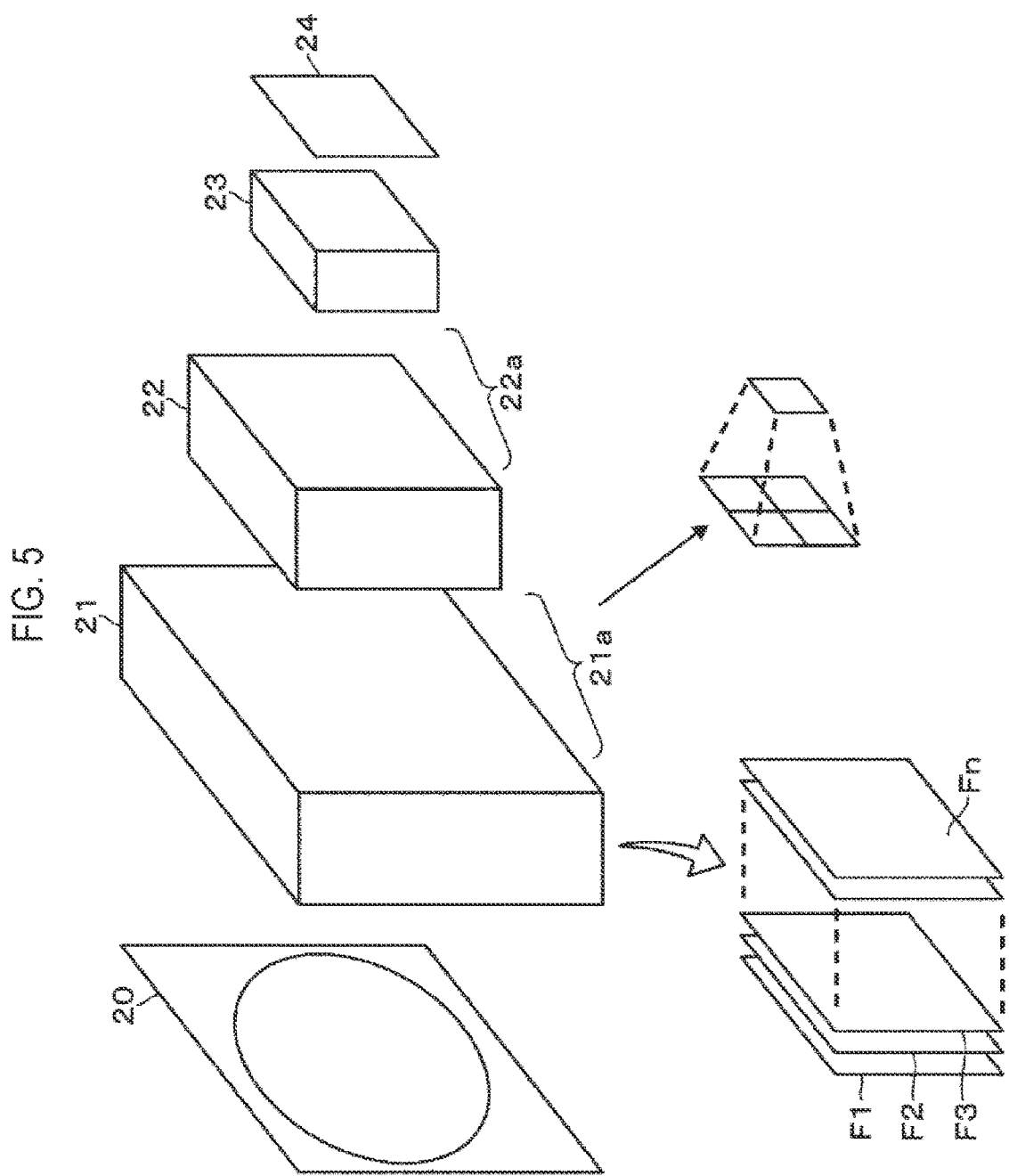
FIG. 5 is an explanatory diagram showing an image of a configuration of a feature region extraction part used in the above embodiment.

A feature region extraction part 2 is configured by a software for executing a deep learning system. For example, a convolution neural network is used as the deep learning system. A process in the case of using the convolution neural network will be described with reference to FIG. 5. FIG. 5 is a diagram schematically showing the convolution neural network for the sake of avoiding complexity of description and illustration. Reference numeral 20 denotes an input image (also referred to as a picked-up image after preprocessing) obtained by the first preprocessing part 12, reference numerals 21, 22, 23 are convolution layers, reference numerals 21a and 22a are pooling layers, and reference numeral 24 is a coupled layer. In the convolution layers 21 to 23, a plurality of filters is laminated one above another. The convolution layer 21 is shown as an image obtained by arranging filters F1, F2, etc. on behalf of the convolution layers 21 to 23.

First, in order to facilitate understanding, the input image 20 obtained by the first preprocessing part 12 is assumed to be a grayscale of n×n pixels. The input image 20 is input to the filter F1 of n×n pixels in the front row of the convolution layer 21 positioned at the preceding stage. The pixel values of the input image 20 may be normalized values or standardized values and may be numerical values of "0" to "1". Assuming that a pixel value of a pixel (i, j) of the input image is x(i, j), the pixel value of the pixel (i, j) which is the pixel of the filter F1 is the same value as x(i, j), which is described to be f1(i, j) {=x (i, j)}. It should be noted that (i, j) indicates a pixel in a row i and a column j in n×n pixels. Pixels of a filter may be referred to as nodes.

A pixel value {f2 (i, j)} of a pixel (i, j) in the filter F2 is calculated by integrating a predetermined coefficient to a pixel value of each of the n×n pixels (1, 1) to (N, N) in the filter F1, adding all of integrated values thus obtained to obtain an added value I, and performing a predetermined calculation on the added value I. The predetermined coefficient is a value determined by learning for each combination of the pixels of the filter F1 and the pixels of the filter F2. More specifically, the predetermined coefficient is determined by repeated supervised learning (with correct label).

The predetermined calculation may be, for example, a calculation using a sigmoid function with the added value I as an input. By performing a convolution process in this way, the pixel values of the n×n pixels (1, 1) to (N, N) in the filter F2 are obtained.

f3(i, j) which is a pixel value in the filter F3 is calculated similarly by using the pixel values of the pixels in the filter F2. Pixel values in each of subsequent filters are sequentially calculated in a similar manner. Finally, pixel values in the filter Fm of the last stage are obtained.

The convolution layer 22 following the convolution layer 21 has a number of pixels smaller than the number of pixels of the convolution layer 21 by the pooling layer 21a interlaid between the convolution layer 21 and the convolution layer 22. The pooling layer 21a is a part for performing a thinning process on pixels. For example, as shown in the image of FIG. 5, in pixel groups in the filter Fm of the last stage in the convolution layer 21, for example, a group of 2×2 pixels which constitutes a square by being arranged adjacent to each other is defined as one pixel. In this case, for example, the largest value among the 2×2 pixel groups is assigned as a pixel value of one pixel. In other words, by performing the above thinning process on, for example, 27×27 pixel groups while excluding pixels other than the pixel of the largest value, 13×13 pixel groups are obtained.

Similarly, the calculation is performed on respective filters of the convolution layers 22 and 23. While in the above description, the pixels of the input image 20 are handled as being the grayscale, when pixel values of the R component, the G component, and the B component are assigned to the pixels of the input image 20, a set of the convolution layers 21, 22 and 23, the pooling layers 21a and 22a, and the coupled layer 24 may be provided for each of the R component, the G component, and the B component. For example, in the case where the above set is provided for each of the R component, the G component, and the B component and thus a total of three sets is provided, the calculation process is performed in parallel on each of the three sets. In addition, each pixel value of the R component, the G component, and the B component is, for example, a normalized or standardized value of 0 to 1.

The calculation process as described above is a process (the convolution process) for separating and extracting feature portions from the input image 20, specifically, a process for detecting which position of a shade pattern formed in the filter is located in the input image. In other words, it can be said that the calculation process is a process of extracting a feature portion represented by a filter from the input image 20 by using the filter.

Returning to FIG. 4, based on the processing result of the feature region extraction part 2, the two-class classification part 3 is configured to determine whether each pixel of the input image 20 is a pixel (defective pixel: black pixel) corresponding to defect or a pixel (white pixel) corresponding to a normal portion without defect. Specifically, the two-class classification part 3 is configured to determine whether each pixel of the input image 20 is a defective pixel on the basis of a vector spatial distribution constituted by a plurality of feature amount vectors in each pixel of the input image 20, which is obtained by the feature region extraction part 2. The feature amount vector referred to herein is a pixel value of a pixel corresponding to each pixel of the input image 20 with respect to all the filters constituting the convolution layers 21 to 23. Therefore, with respect to each pixel of the input image 20, the two-class classification part 3 determines whether the respective pixel is a defective pixel or a pixel at a normal portion on the basis of the arrangement distribution of pixel values of all the filters corresponding to the respective pixel.

An example of the two-class classification part 3 may include software that executes a support vector machine (SVM), or the like.

Figure 6:
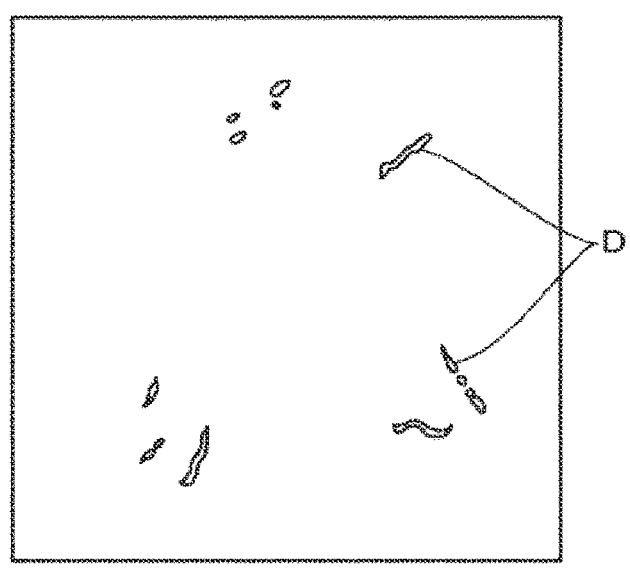
FIG. 6 is an explanatory diagram showing an output result obtained by a two-class classification part used in the above embodiment, which illustrates a defect region in association with an image region inputted to the feature region extraction part.

An example of the output result of the two-class classification part 3 is shown in FIG. 6. In FIG. 6, a square region corresponds to the region of the input image 20 constituted by the n×n pixel groups, and D indicates defect regions (D is representatively shown with respect to only two defect regions). The defect region D is an aggregate of black pixels which are, for example, defective pixels, which is shown in white in FIG. 6. The image data shown in FIG. 6 corresponds to binarized image data (referred to as "binarized data") 30 shown in FIG. 4. The binarized data 30 corresponds to the second image data shown in FIG. 3.

In FIG. 4, reference numeral 40 denotes a second preprocessing part, reference numeral 5 denotes a defect candidate output part using the deep learning system, and reference numeral 41 denotes a selection part. A combination of the defect candidate output part 5 and the selection part 41 constitutes the first estimation part 4 shown in FIG. 3.

Figure 7A:
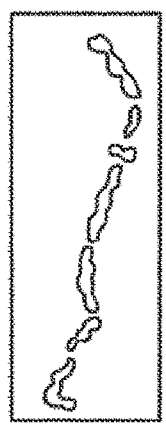
FIGS. 7A to 7C are explanatory diagrams showing a cutout image cut out as a rectangular image including the defect region, from an image including the defect region obtained by the two-class classification part.
Figure 7B:
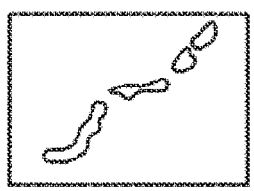
Figure 7C:
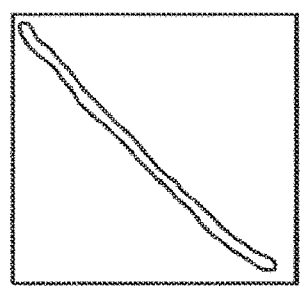

The second preprocessing part 40, based on the binarized data 30, performs a process for creating the first image data described in detail in FIG. 3 is performed. That is to say, in this embodiment, the first image data for defect classification determination is created on the basis of the second image data for defect classification determination and the input image 20. As described above, the first image data is a rectangle image data including one defect region and a surrounding region of the one defect region. Each pixel value of the R component, the G component, and the B component is assigned to each pixel. The pixel values of the R component, the G component, and the B component are, for example, normalized or standardized values of 0 to 1. FIGS. 7A to 7C are explanatory diagrams showing an example of the first image data obtained by the second preprocessing part 40.

The defect candidate output part 5 is composed of software for executing the deep learning system. For example, the convolution neural network described in the feature region extraction part 2 is used as the software. Describing the defect candidate output part 5 in association with FIG. 5, an output layer (not shown in FIG. 5) located at a subsequent stage of the coupled layer 24 is constituted by nodes which correspond to respective types of defects. For example, if the number of types of defects to be detected is 10, the number of nodes is 10.

The relationship between each pixel value of the coupled layer 24 and a value outputted from each node is substantially the same as the relationship between the pixel value of each pixel of the filter F2 and the pixel value of each pixel of the filter F3, which is described in FIG. 5 (coefficients and functions are different from those in the case of FIG. 5). That is to say, the pixel value of each pixel of the coupled layer is integrated by a predetermined calculation. An added value obtained by adding all integrated values is outputted to each node. Each node performs a predetermined calculation on the added value to output the result.

Figure 8:
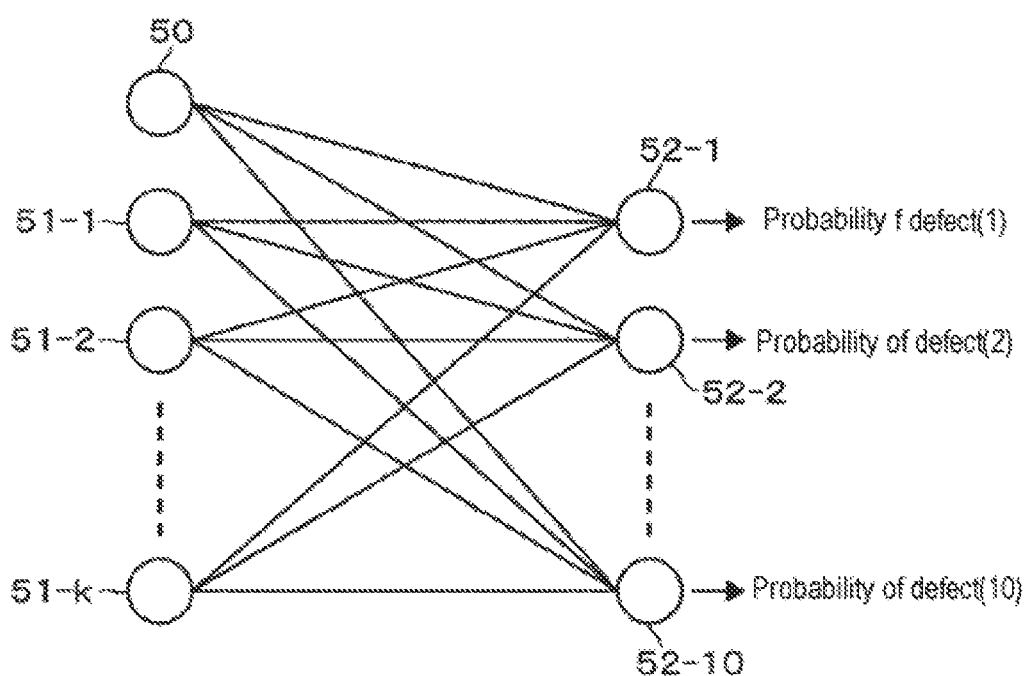
FIG. 8 is an explanatory diagram showing an image of a configuration of a defect candidate output part used in the above embodiment.

FIG. 8 is an explanatory diagram schematically showing an output layer of the neural network which constitutes the defect candidate output part 5. In this example, it is assumed that the number of pixels of the coupled layer is k and the number of nodes of the output layer is 10. Reference numerals 51-1 to 51-k denote pixels of the coupled layer, reference numerals 52-1 to 52-10 denote nodes of the output layer, and defects (1) to (10) denote types (classes) of the defects. Reference numeral 50 is a bias output part for outputting a bias value to be added to the integrated value.

Each of the nodes 52-1 to 52-10 corresponds to 10 types of defects. An output value (a calculated value) outputted from each of the nodes 52-1 to 52-10 is a value of 0 to 1. This outputted value is a numerical value indicating a degree of correctness of defects listed as candidates in the defect candidate output part 5. Here, "1" indicates 100% as estimated by the neural network, "0" indicates that it is impossible as a candidate for a defect. For example, assuming that the output value of the node 52-1 is "0.8", it means that a probability that the type of defect is the type of defect corresponding to the node 52-1 is 80%.

In this manner, a candidate for the type of defect and a score which can also be referred to as a probability indicating the degree of correctness are obtained by the neural network (the defect candidate output part 5). Then, the type of defect estimated in the first estimation part 4 is selected by the selection part 41 shown in FIG. 4 on the basis of the candidate for the type of defect and the score. The selection result is outputted as an estimation result.

A case in which three types of "center mode", "hot spot", and "comet" are cited as candidates for types of defects in the neural network will be described as a specific example of the estimation procedure in the first estimation part 4. Various types of defects including these three types of defects will be described later in detail.

As an example of a selection method, the selection part 41 may select the first candidate as the estimation result when a score of a first candidate is equal to or greater than a threshold value Sa (e.g., 0.9) and a difference between the score of the first candidate and a score of the second candidate is equal to or greater than a threshold value Sb (e.g., 0.25).

<Case 1>
First candidate=center mode (score is 0.92)
Second candidate=hot spot (score is 0.64)
Third candidate=comet (score is 0.46)
In this case, the score of the first candidate is equal to or greater than the threshold Sa (0.9). Since the difference between the first candidate and the second candidate is 0.28 which is equal to or greater than the threshold Sb (0.25), the "center mode" is outputted as the estimation result.

<Case 2>
First candidate=center mode (score is 0.92)
Second candidate=hotspot (score is 0.88)
Third candidate=comet (score is 0.46)
In this case, since the score of the first candidate is equal to or greater than the threshold value Sa (0.9) but the difference between the first candidate and the second candidate is 0.04 which is less than the threshold value Sb (0.25). "classification impossible" is outputted as the estimation result.

<Case 3>
First candidate=center mode (score is 0.84)
Second candidate=hot spot (score is 0.55)
Third candidate=comet (score is 0.43)
In this case, since the difference between the first candidate and the second candidate is 0.29, which is equal to or greater than the threshold value Sb (0.25), but the score of the first candidate is less than the threshold value Sa (0.9), "classification impossible" is outputted as the estimation result.

The selection method is not limited to the above example. For example, a method in which whether defect classification of the first candidate is outputted or handled as classification impossible on the basis of only whether the difference between the first candidate and the second candidate is equal to or greater than the threshold value may be used.

Furthermore, the first estimation part 4 may select a first candidate (a candidate with the highest score) among candidates for the types of defects outputted by the neural network (the defect candidate output part 5) as the estimation result, without performing the selection process by the selection part 41.

Returning to FIG. 4, the second estimation part 6 sequentially extracts the defect regions one by one on the basis of the binarized data as the second image data, obtains an attribute of each defect region and a position (position information) of each defect region on the wafer W, and estimates the type of defect for each defect region by comparing the attribute and the position with a rule-based system created beforehand. To do this, the second estimation part 6 includes an attribute extraction part for extracting the attribute of the defect region, a defect position detection part for detecting the position of the defect region on the wafer W, and a rule-based system. Examples of the attribute of the defect region may include the shape, area, length dimension, width dimension, circumference length, extending direction, an average value of grayscale values, and the like. Examples of the shape of the defect region may include a degree of circularity of the defect region and a degree of unevenness around the defect region.

An example of a method of obtaining the length dimension of the defect region and the like is described below.

The length dimension of the defect region corresponds to a length of the major axis of an equivalent ellipse. The length of the major axis is obtained by the following method.

First, a gravity center Gx in an X-axis direction and a gravity center Gy in a Y-axis direction of the defect region are obtained, and then a variance Ax in the X-axis direction (a value obtained by squaring a difference between an X-axis coordinate position and the gravity center Gx for each pixel and summing up the squared values for each pixel), a variance Ay in the Y-axis direction, and a covariance Axy in the X–Y axis (a value obtained by integrating the difference between the X-coordinate position and the gravity center Gx and a difference between a Y-coordinate position and the gravity center Gy for each pixel and summing up the integrated values) are obtained. The length of the major axis is obtained by the following equation.

$$\text{Length of major axis} = 2^{1/2} \times [Ax + Ay + \{(Ax-Ay)^2 + 4Axy^2\}^{1/2}]^{1/2}$$

The width dimension of the defect region corresponds to, for example, a length of the minor axis of the equivalent ellipse. The length of the minor axis is obtained by the following equation.

$$\text{Length of minor axis} = 2^{1/2} \times [Ax + Ay - \{(Ax-Ay)^2 + 4Axy^2\}^{1/2}]^{1/2}$$

The extending direction of the defect region is a direction in which the major axis of the equivalent ellipse extends.

The degree of circularity of the defect region is a value represented by, for example, $4\pi \times$(area of defect region)/(circumferential length of defect region)$^2$ The degree of unevenness around the defect region is, for example, (area of defect region)/(area of convex hull of defect region). The area of the convex hull is the smallest convex polygon which encompasses all the pixels of the defect region. The position (position information) of the defect region on the wafer W is, for example, a coordinate position on the wafer W and/or a distance from the center of the wafer W.

The rule-based system includes, for example, a rule (conditional expression) defined for each type of defect, and estimates the type of defect by comparing the attribute and position of the defect region with the rule.

An example of the rule is as follows.
In the case where defect is "center mode",
IF (distance from center is between thresholds S1 and S2),
IF (area is between thresholds S3 and S4), and
IF (degree of circularity is between thresholds S5 and S6)
→ The type of defect is the center mode.
In the case where defect is "hot spot",
IF (area is between thresholds T1 and T2),
IF (degree of circularity is between thresholds T3 and T4), and
IF (average value of grayscale value is between thresholds T5 and T6)

→ The type of defect is the hot spot.

Similarly, other defects are defined in such a manner that IF ( . . . ), IF ( . . . ) and . . . → the type of defect is ○○○.

For example, the number of types of defects is assumed to be 10 and conditional expressions corresponding to the ten types of defects are assumed to be defined as conditional expressions 1 to 10. In this case, the rule-based system determines whether defect regions to be estimated match the conditional expressions 1 to 10 on the basis of the detected attribute and position. If it is determined that there is the matched conditional expression, the type of defect corresponding to the respective conditional expression becomes the estimation result. If it is determined that there is no matched conditional expression, classification impossible is outputted as the estimation result. Further, the priority of conditional expressions may be determined in advance. In a case where there is a plurality of matched conditional expressions, the type of defect corresponding to a respective conditional expression having the higher priority becomes the estimation result.

Returning to FIG. 4, the comprehensive determination part 7 performs a comprehensive determination with respect to the type of defect on the basis of the estimation result of the first estimation part 4 using the deep learning system and the estimation result of the second estimation part 6 using the rule-based system. The comprehensive determination is to finally determine whether a defect region as a determination target has any type of defect.

For the sake of convenience in illustration of the comprehensive determination, the estimation result of the first estimation part 4 is referred to as a deep learning (DL) classification, and the estimation result of the second estimation part 6 is referred to as a rule-based classification.

An example of the comprehensive determination method is as follows.

When the DL classification and the rule-based classification are the same, the estimation result is adopted as it is as the determination result.

Priority of the DL classification and the rule-based classification is set for each type of defect in advance to determine which of the DL classification and the rule-based classification is to be adopted as the estimation result. In a case where the DL classification and the rule-based classification are different from each other, the respective estimation result is outputted according to the priority.

The precision of the DL classification is greatly influenced by preliminary learning. Thus, the DL classification related to estimation of defect classification according to insufficient learning has a low priority (the rule-based classification has priority), whereas the DL classification related to estimation of defect classification according to sufficient learning has a high priority (the DL classification has priority). In order to implement such a determination method, for example, a priority matrix table shown in FIG. 12 can be used.

If the type of defect in the defect region as a determination target is determined based on the priority matrix table shown in FIG. 12 by the comprehensive determination part 7, the determination result is displayed on the display part 71. Specific examples of the display of the determination result and the type of defect will be described in an operation description to be described later.

Figure 9:
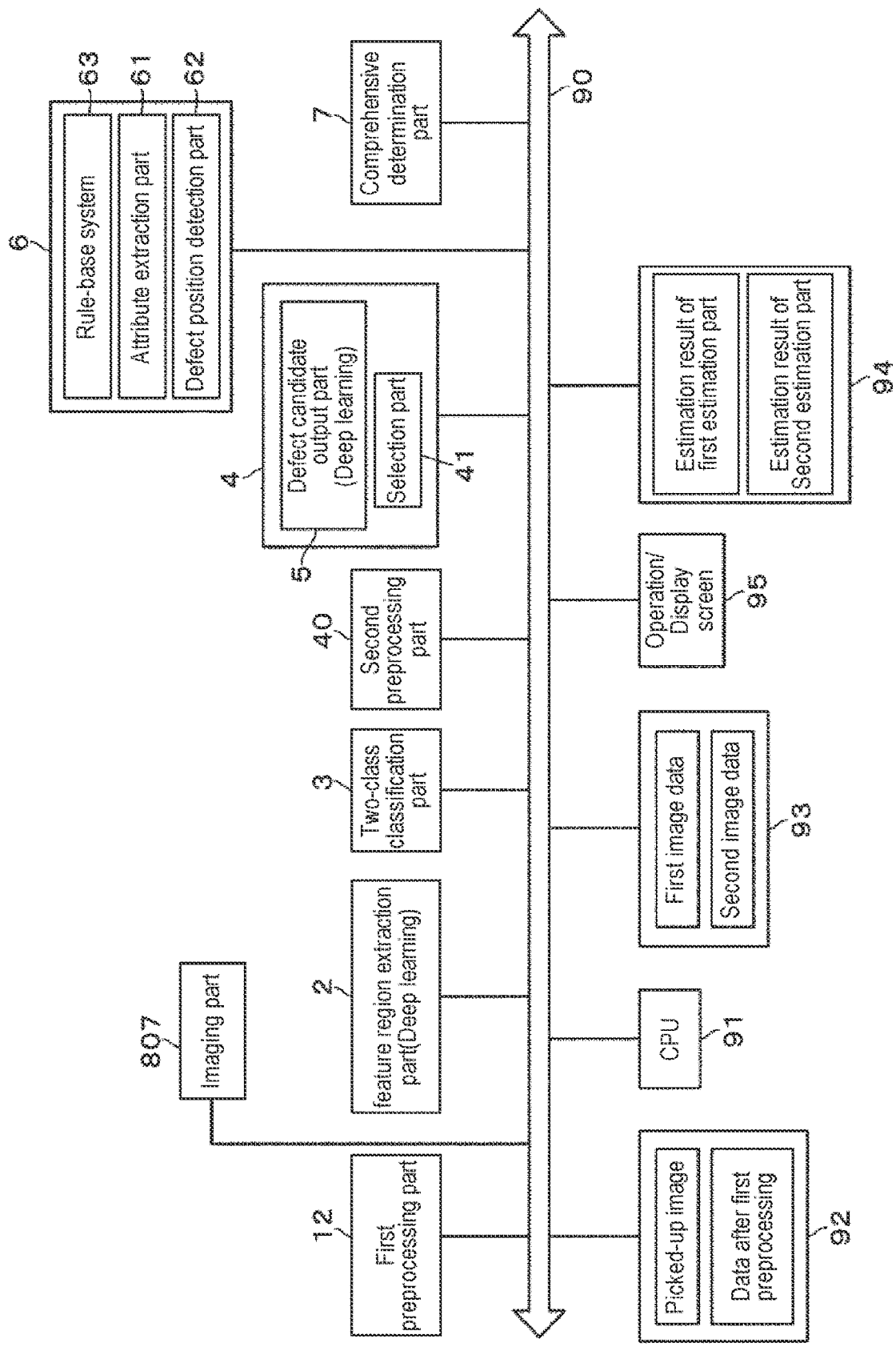
FIG. 9 is a configuration diagram showing a configuration of an embodiment of the substrate defect inspection apparatus according to the present disclosure.

A configuration of a computer corresponding to the block diagram of FIG. 4 is shown in FIG. 9. Reference numeral 90 is a bus and reference numeral 91 is a CPU. The first preprocessing part 12, the feature region extraction part 2, the two-class classification part 3, the second preprocessing part 40, the first estimation part 4, the second estimation part 6, and the comprehensive determination part 7 shown in FIG. 9 may correspond to storage parts that stores softwares for executing the respective processes described above. In the second estimation part 6, the attribute extraction part, the defect position detection part, and the rule-based system as described above are denoted by reference numerals 61, 62, and 63, respectively. The rule-based system 61 includes the above-described rule (conditional expression) and an inference engine for inferring using the rule.

Reference numerals 92, 93 and 94 denote storage parts. The storage part 92 stores the picked-up image and data obtained by being preprocessed by the first preprocessing part 12. The storage part 93 stores the first image data and the second image data, and also serves as a first storage part and a second storage part. The storage part 94 stores the estimation result obtained by the first estimation part 4 and the estimation result obtained by the second estimation part 6. Reference numeral 95 is an operation screen of the computer and also serves as the display part 71.

Each of the above-described softwares is stored in a storage medium such as a flexible disk, a compact disk, a hard disk, a magneto-optical (MO) disk, a memory card, and the like, and is installed from the storage medium on each of the storage parts 12, 2, 3, 40, 4, 6, and 7.

Next, the overall operation of the above-described embodiment related to the substrate defect inspection apparatus and the substrate defect inspection method will be summarized mainly with reference to the description of FIG. 4.

An image (the picked-up image) of the entire wafer W as a substrate, which is picked up by the imaging part 807, is subjected to the enhancement process and a reduction process by the first preprocessing part 12, and is inputted as the input image 20 (see FIG. 5) to the feature region extraction part 2 using the deep learning system. The input image 20 is subjected to the convolution process in the feature region extraction part 2 so that a pixel value of each pixel on a filter is obtained with respect to each pixel of the input image 20. Subsequently, the two-class classification part 3 determines whether a respective pixel is a defective pixel according to the arrangement distribution of pixel values in a group of pixel values of the filter corresponding to each pixel of the input image 20, and obtains a binarized data (the second image data) (see FIG. 6).

The binarized data is subjected to a preprocess in the second preprocessing part 40. In other words, based on the binarized data and the picked-up image (the input image 20) preprocessed by the first preprocessing part 12, an image (the first image data) which is a rectangular image including one defect region and includes the pixel values of the R component, the G component, and the B component, is obtained. Based on the first image, the first estimation part 4 obtains data by associating a candidate for the type of defect corresponding to the defect region with values indicating the degree of correctness by using the deep learning system. The first estimation part 4 outputs the estimation result of the type of defect on the basis of the obtained data.

On the other hand, the second estimation part 6 obtains the attribute of one defect region and the position of the respective defect region on the wafer W, and estimates the type of defect corresponding to the respective defect region by using the rule-based system on the basis of information thus obtained. The comprehensive determination part 7, based on the estimation result of the first estimation part 4 and the estimation result of the second estimation part 6, comprehensively determines the type of defect with reference to the priority matrix table shown in FIG. 12.

Figure 10:
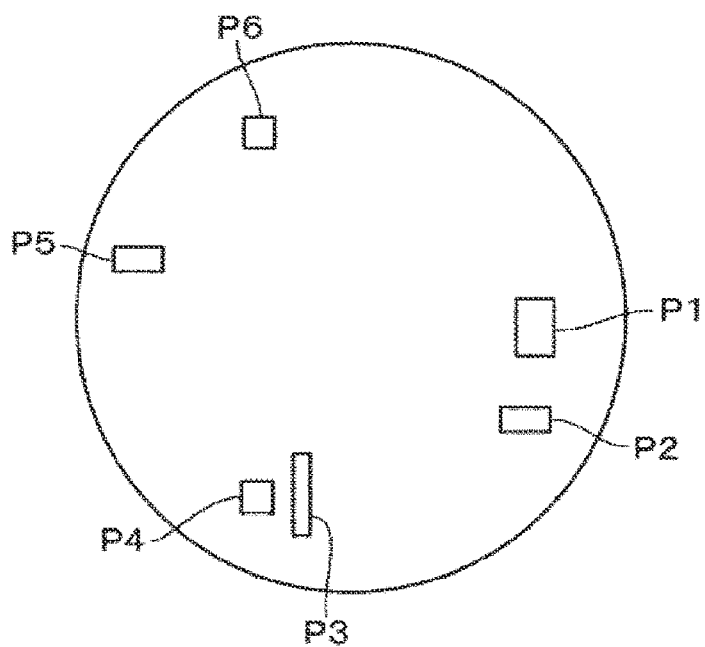
FIG. 10 is an explanatory diagram showing an example of a display for displaying the type of defect determined by a comprehensive determination and a position on a wafer in association with each other.

In the case where the binarized data includes a plurality of defect regions, the first estimation part 4 and the second estimation part 6 estimate the plurality of defect regions sequentially one by one, and perform the comprehensive determination on the basis of respective estimation results. FIG. 10 shows an example in which the results of the comprehensive determination are displayed on the display part 71. In FIG. 10, P1 to P6 indicate, for example, positions of defects on the wafer in the picked-up image. The types of defects respectively corresponding to the positions P1 to P6 are shown in the vicinity of the outline of the wafer W.

Here, an example of the type of defect and the state (or cause) of the defect will be given as follows.

Scratch: the front surface of the wafer W is scratched

Comet: this is a coating spot portion caused when air bubbles present in a dropped resist solution in a case where the resist is spin-coated (rotational coating process) on the front surface of the wafer W. The coating spot portion tends to have thinner film thickness than the surrounding.

Arcing: this is a defect that causes a discharge phenomenon in which an electrical arc occurs on the front surface (or the back surface) of the wafer W during in a plasma process, and the front surface (or the back surface) is likely to be burnt.

Center mode: this is a defect caused when the position of a resist nozzle deviates from the rotational center position of the wafer W while a resist is spin-coated (spin coating process) on the front surface of the wafer W.

Hot spot: this is a defect caused by defocus in the exposure device, and occurs when foreign matter presents between a wafer stage inside the exposure device and the back surface of the wafer W.

Figure 11A:
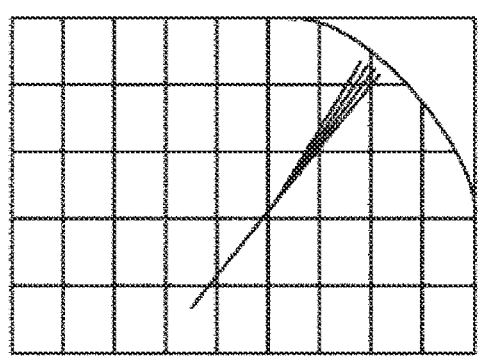
FIGS. 11A to 11D are explanatory diagrams schematically showing a specific example of a defect.
Figure 11B:
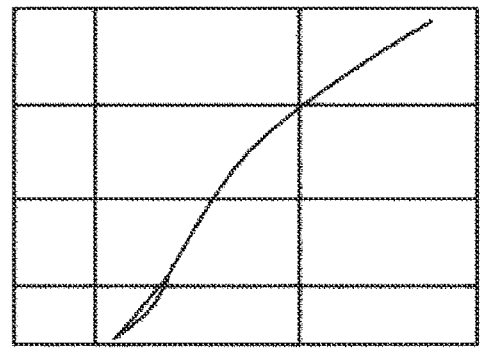
Figure 11C:
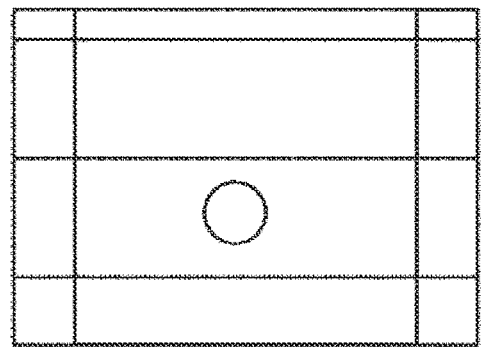
Figure 11D:
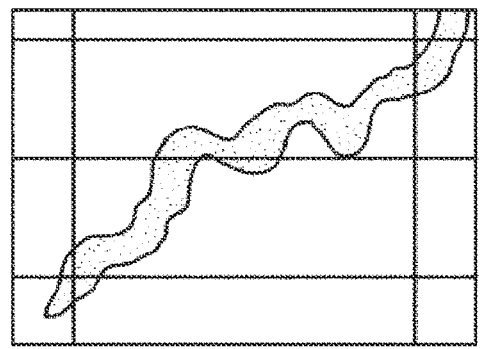

FIGS. 11A to 11D show the states of four types of defects on behalf of various types of defects. FIG. 11A shows the comet, FIG. 11B shows the scratch, FIG. 11C shows the hot spot, and FIG. 11D shows the arcing. In FIGS. 11A to 11D, vertical and horizontal lines within a frame are scribe lines.

In the above embodiment, the type of defect is determined by using, in combination, the estimation of the defect classification by the deep learning system and the estimation of the defect classification by the rule-based system based on the attribute of the defect region and the position of the defect region on the wafer W. Accordingly, it is possible to determine the type of defect occurring on the wafer W with high accuracy. Since the binarized data is also created using the deep learning system on the basis of the picked-up image, it is possible to extract a defect region with high accuracy by performing sufficient learning. This increases the determination accuracy of the type of defect.

A modification of the present disclosure will be described below.

As described at the beginning of the embodiment of the substrate defect inspection apparatus, the present disclosure may be configured to obtain a picked-up image by picking up an image of a substrate with a monochrome camera. In this case, the input image 20 shown in FIG. 5 and the first image data which is the output data of the second preprocessing output part 40 shown in FIG. 4 are monochrome images. Similarly to color images, the monochrome images can be processed by using pixel values (grayscale values) for each pixel.

Further, even if the picked-up image is a color image, the input image 20 and the first image data may be created using one or two of the R component, the G component, and the B component, and processing may be performed based on the created result.

In the above-described embodiment, the rule-based system creates the conditional expression on the basis of the detected attribute and position of the defect region as an estimation object. However, the rule-based system may create the condition expression using only the attribute without using the position. The attribute of the defect region used in the conditional expression may be at least one of a shape, an area, a length dimension, a width dimension, a circumference length, and an extending direction. For example, in the conditional expressions created for each type of defect, only the shape of the defect region may be included in the attribute of the defect region.

The binarized data corresponding to the second image data is not limited to one created by the above-described embodiment. As an example, the binarized data may be created by binarizing values of received light intensity (degree of grayscale) of the respective R component, G component, and B component represented for each pixel of the picked-up image by using a threshold value.

Further, the deep learning system used in the feature region extraction part 2 and the defect candidate output part 5 is not limited to the convolution neural network, and other deep learning systems may be used.

According to the present disclosure, on the basis of a first image data which is created based on a picked-up image obtained by picking up an image of a substrate and includes a defect region and a surrounding region of the defect region, in which a pixel value (grayscale value) corresponding to a grayscale is assigned to each pixel, a type of defect is estimated using deep learning system. In addition, on the basis of an attribute of the defect region extracted from a second image data which is created based on the picked-up image and is obtained by binarizing the defect region in which defect is generated and the surrounding region of the defect region, the type of defect is estimated using a rule-based system. The type of defect is comprehensively determined on the basis of an estimation result obtained by the deep learning system and an estimation result obtained by the rule-based system. Therefore, it is possible to determine the type of defect generated in the substrate with high accuracy.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate defect inspection apparatus comprising:
a feature region extraction part configured to extract a feature region from an image, which is obtained by capturing a substrate, using a deep learning system;
a two-class classification part configured to output binarized data for defect classification estimation indicating a defect region in which a defect is generated and a surrounding region of the defect region based on an extraction result obtained by the feature region extraction part; and an estimation part configured to estimate a type of defect based on an attribute of the defect region extracted from the binarized data which is output from the two-class classification part, wherein the feature region extraction part is configured to receive image data corresponding to the image, of which a pixel value is assigned to each of a plurality of pixels, as input data, and the feature region extraction part includes a plurality of convolution layers, each of which is provided with a plurality of filters, the plurality of pixels being arranged in a matrix form in each of the plurality of filters, and wherein the two-class classification part is configured to use data obtained by associating pixels obtained by a convolution process in each of the plurality of convolution layers with calculation values which are results of the convolution process, to classify whether each of the plurality of pixels is a pixel corresponding to the defect or a pixel corresponding to a normal portion based on an arrangement distribution of the calculation values of the plurality of convolution layers for each of the plurality of pixels, and to obtain the binarized data for the defect classification estimation.

2. The substrate defect inspection apparatus of claim 1, wherein the estimation part is configured to estimate the type of defect using a rule-based system, based on the attribute and a position of the defect region.

3. The substrate defect inspection apparatus of claim 1, wherein the attribute of the defect region is at least one of a shape, an area, a length dimension, a width dimension, a circumference length, and an extending direction.

4. The substrate defect inspection apparatus of claim 3, wherein the attribute of the defect region includes the shape, and wherein the shape includes a degree of circularity of the defect region and a degree of unevenness around the defect region.

5. The substrate defect inspection apparatus of claim 1, further comprising a contrast enhancement processing part configured to perform a contrast enhancement process with respect to the image before feature amounts are extracted by the feature region extraction part.

6. A substrate defect inspection method comprising:
a feature region extraction process of extracting a feature region from an image, which is obtained by capturing a substrate, using a deep learning system;
a two-class classification process of outputting binarized data for defect classification estimation indicating a defect region in which a defect is generated and a surrounding region of the defect region based on an extraction result obtained in the feature region extraction process; and
an estimation process of estimating a type of defect based on an attribute of the defect region extracted from the binarized data which is output from the two-class classification process, wherein, in the feature region extraction process, image data corresponds to the image, of which a pixel value is assigned to each of a plurality of pixels, as input data, each of a plurality of convolution layers is provided with a plurality of filters, and the plurality of pixels is arranged in a matrix form in each of the plurality of filters, and wherein the two-class classification process is configured to use data obtained by associating pixels obtained by a convolution process in each of the plurality of convolution layers with calculation values which are results of the convolution process, to classify whether each of the plurality of pixels is a pixel corresponding to the defect or a pixel corresponding to a normal portion based on an arrangement distribution of the calculation values of the plurality of convolution layers for each of the plurality of pixels, and to obtain the binarized data for the defect classification estimation.

7. The substrate defect inspection method of claim 6, wherein the estimation process is configured to estimate the type of defect using a rule-based system, based on the attribute and a position of the defect region.

8. The substrate defect inspection method of claim 6, wherein the attribute of the defect region is at least one of a shape, an area, a length dimension, a width dimension, a circumference length, and an extending direction.

9. The substrate defect inspection method of claim 8, wherein the attribute of the defect region includes the shape, and wherein the shape includes a degree of circularity of the defect region and a degree of unevenness around the defect region.

10. The substrate defect inspection method of claim 6, further comprising a contrast enhancement processing process of performing a contrast enhancement process with respect to the image before feature amounts are extracted in the feature region extraction process.

11. A non-transitory computer-readable storage medium that stores a software used in an apparatus for inspecting a defect generated in a substrate, wherein the software includes a program having a group of instructions for executing the substrate defect inspection method of claim 6.

* * * * *